(No Model.) 2 Sheets—Sheet 2.
P. P. TRUEHEART & M. S. KIMBALL.
APPARATUS FOR HEATING AND SETTLING BRINE, &c.
No. 432,457. Patented July 15, 1890.
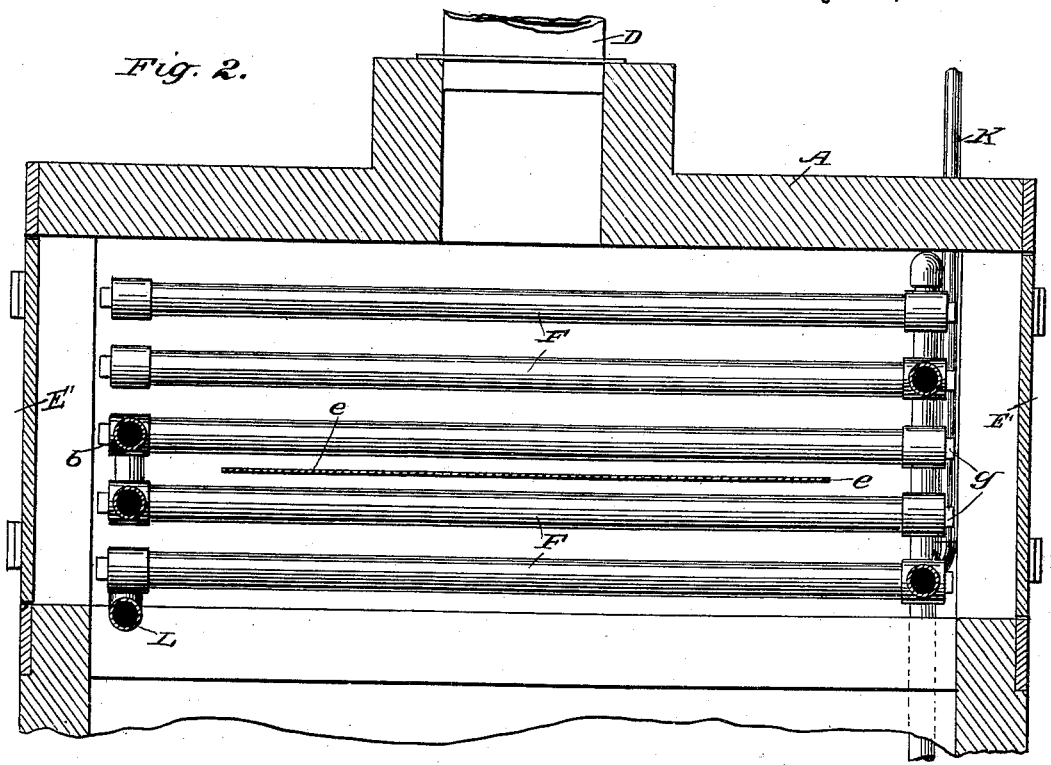
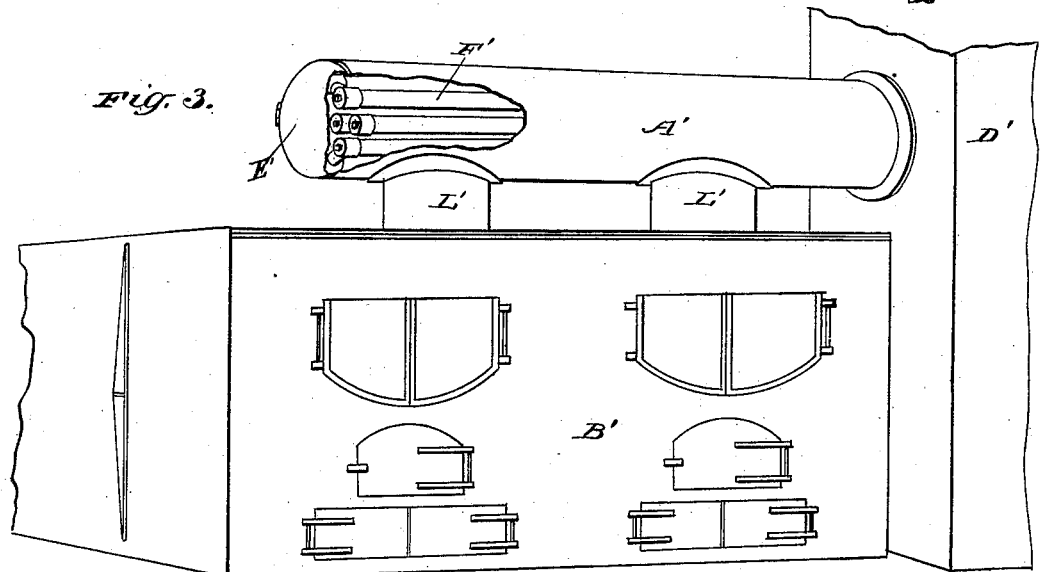
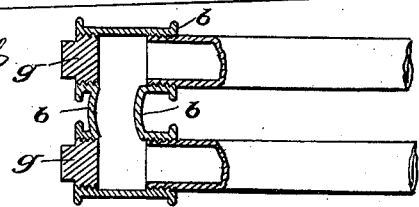
WITNESSES: INVENTOR:

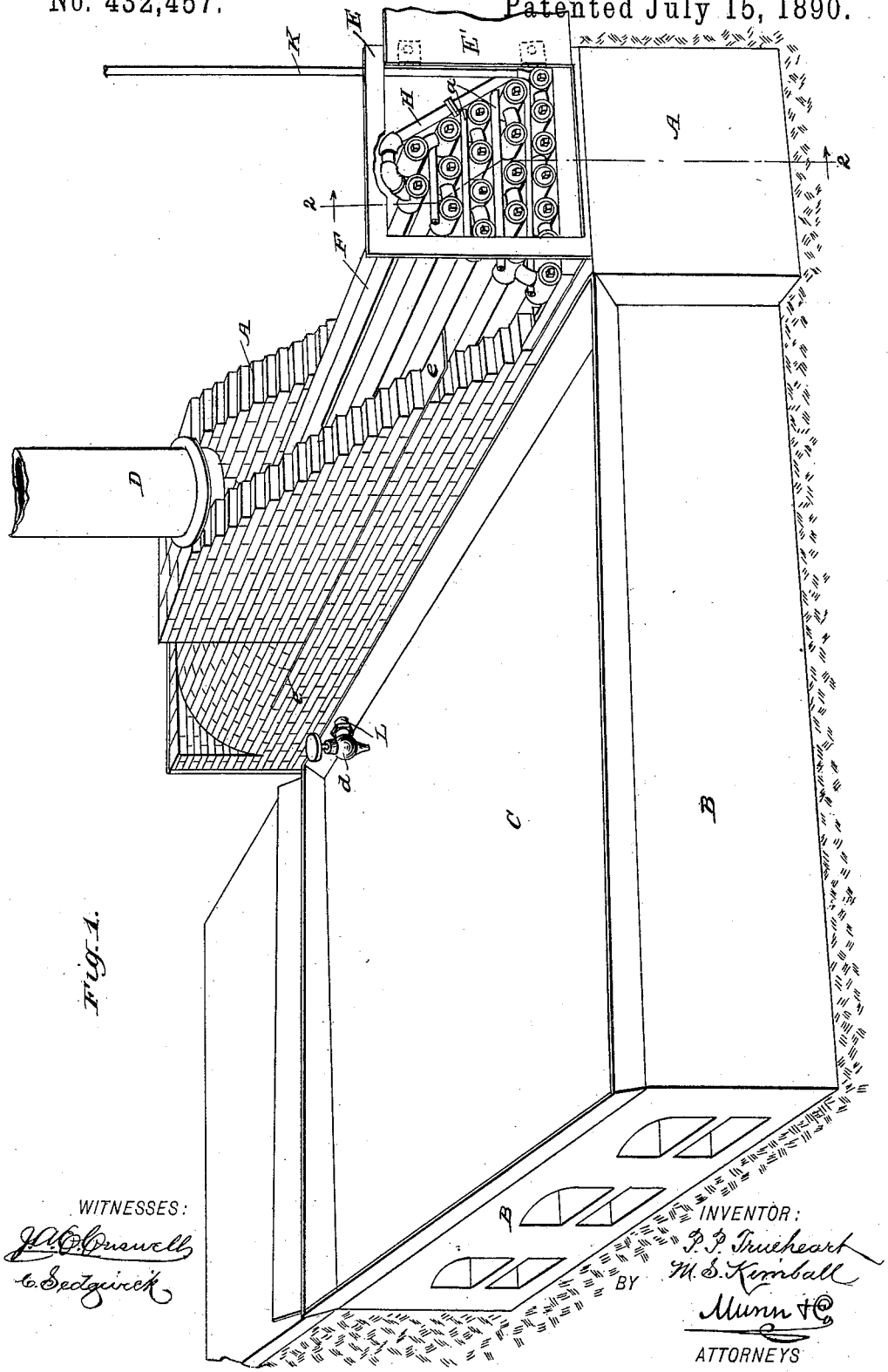

UNITED STATES PATENT OFFICE.

POWHATAN P. TRUEHEART AND MILTON S. KIMBALL, OF STERLING, KANSAS.

APPARATUS FOR HEATING AND SETTLING BRINE, &c.

SPECIFICATION forming part of Letters Patent No. 432,457, dated July 15, 1890.

Application filed November 20, 1889. Serial No. 331,018. (No model.)

*To all whom it may concern:*

Be it known that we, POWHATAN P. TRUEHEART and MILTON S. KIMBALL, of Sterling, in the county of Rice and State of Kansas, have invented a new and Improved Apparatus for Heating and Settling Brine and other Liquids, of which the following is a full, clear, and exact description.

Our invention relates to that class of apparatus that is used for separating the impurities from salt brine, sugar-cane juice, and other liquids. We shall describe the apparatus chiefly as applied to the settling and heating of salt brine; but it may be used for settling and purifying cane-juice in the manufacture of sugar and syrup with good results. It is well known that salt brine in its crude state contains many impurities—such as sulphur, soda, sulphate of calcium, sulphate of magnesia, &c., which must be removed before the salt is fit for the market. This is now done at great expense. By the present process of salt-manufacture the salt brine is pumped into large evaporating-pans while in a cold state, and consequently considerable heat is necessary and considerable time consumed before the brine is sufficiently hot for settling and rapid evaporation to take place.

The object of our invention is to utilize the waste heat from under the evaporating-pan for heating and settling the brine—that is, separating the impurities from it—so that the brine shall flow into the evaporating-pan hot and pure. It will be seen that by so doing the settling and heating will cost absolutely nothing after the apparatus is once put in, and by having the brine hot when it enters the evaporating-pan the quantity of the brine evaporated in a given time is greatly increased.

To this end our invention consists in the construction and combination of parts hereinafter fully described, and more specifically pointed out in the claims.

Reference is to be had to the accompanying drawings, forming a part of this specification, in which similar letters of reference indicate corresponding parts in all the figures.

Figure 1 is a perspective view of an evaporating-pan and furnaces with the flue and apparatus attached, the doors of the flue and a portion of the sides being removed to show the position of the pipes within; Fig. 2, a vertical longitudinal section of the apparatus on the line 2 2 of Fig. 1; Fig. 3, a perspective view of a modification of the apparatus as applied to a steam-boiler, with a side of the flue broken away to show the pipes within; and Fig. 4, a detail view, partly in section, of the pipe-connections and of the plugs in the ends of the pipes.

The flue A is built at the back of the furnaces B, which furnish heat for the evaporating-pan C. The flue A connects with the furnaces B by openings from one into the other, so that the waste heat and smoke from the furnaces will pass through the flue to the smoke-stack D. The flue is provided at each end with large doors E', the full size of the ends of the flue above the floor, and which are hung in the frames E. The doors are made the full size of the end of the flue above the floor, so that easy access may be had to the pipes within the flue to clean them. The floor-line is even with the top of the pan C and the bottom of the frame. Arranged within the flue A, and running lengthwise therein, is a pyramidal tier of pipes F, the widest row of them being at the bottom and nearest the furnaces B, and the narrowest row, consisting of two pipes, being at the top. By this arrangement the greatest heating-surface is at the bottom, where there is the greatest heat, and as the brine flows from the lowest tier of pipes into the evaporating-pan C it will be hotter than if there were few pipes in the lowest tier. The pipes F are supported by cross-ties *a*, laid between each two tiers of pipes, and sufficient pitch is given the pipes so that liquor placed in the upper pipes will flow backward and forward through each succeeding tier until the lowest is reached. Instead of arranging the pipes in pyramidal form, they may be arranged in a square or other tier, if desired.

The pipes F are connected by the T's *b*, which are made in one piece large enough to receive the ends of two of the pipes F, and into which the pipes are screwed. The pipes F are connected by the T's *b* at alternate ends—that is, so that each pipe shall connect at one end only with the next pipe—thus forming a continuous coil from top to bottom, so that brine entering the upper pipes will flow the entire length of the coil. In this way the brine is exposed for a longer time to the heat in the flue, and the impurities have time to settle before the brine reaches the evaporating-pan C. A pipe H enters the upper pipe F, through which the brine is pumped into the pipes.

The lowest of the bottom tier of pipes F and the one nearest the evaporating-pan C connect with an outlet-pipe L, which projects through the side of the flue A, and is provided with a valve $d$, by which the flow of brine from the pipes F to the pan C is regulated.

A flat metal deflector $e$ is built into the sides of the flue A and extends across the same between the pipes F. It is open at each end of the flue, so that as the heat from the furnaces B rises in the flue it strikes the deflector $e$ and is thrown to each end of the flue. It then comes back above the deflector and passes into the smoke-stack D. In this manner the full benefit of the waste heat is obtained.

In the ends of the pipes F and T's $b$, on a line with the pipes, are plugs $g$, which are screwed into said pipes and T's, and which are the full size of the pipes F, so that when the pipes become clogged or foul with impurities the plugs may be removed and the pipes cleaned. A vertical pipe K opens from one or more of the pipes F, so that if the brine in the pipes becomes sufficiently hot to generate steam the steam will escape through the pipe K, thus removing all danger of explosion. When our apparatus is to be applied to a new salt-plant, the flue A is built with the furnace B, with openings between the two for the heat and smoke; but when the apparatus is applied to an old plant it will be necessary to tear away a portion of the rear wall of the furnace to admit the smoke and heat to the flue A. In Fig. 3 we have shown the apparatus as applied to an ordinary boiler-furnace B'. The arrangement is practically the same, the heat from the boiler-furnace entering the flue A', which is made of iron instead of masonry, through the funnels L', which support the flue A', and passing between the pipes F' and into the smoke-stack D' in the manner already described. The outlet and inlet pipes are not shown in this view; but they would be arranged as in the flue A, the only difference being that in this case said pipes would be longer on account of the change in position of the flue A'.

By this apparatus a continuous flow of hot brine may be maintained through the pipes F and into the pan C, the impurities will settle in the pipes, and the effectiveness of the evaporating-pan be greatly increased.

Having thus fully described our invention, we claim as new and desire to secure by Letters Patent—

1. An apparatus for heating and settling brine and other liquids, consisting, essentially, of a flue connecting the smoke-stack and furnace of an evaporating-pan, tiers of connected pipes within the flue, adapted to carry the liquid to the pan, removable plugs at the ends of said pipes, by removing which said pipes may be cleaned, and said flue having an opening and a closure therefor at the end adjacent to said plugs, substantially as set forth.

2. An apparatus of the character described, comprising a flue connecting the evaporating-pan furnace with its smoke-stack, and a series or tier of pipes in said flue, having couplings at their ends, provided with screw-plugs about the size of the bores of said pipes and in alignment therewith, whereby by removing the plugs the pipes may be cleaned, substantially as set forth.

3. An apparatus for heating and settling brine and other liquids, consisting, essentially, of a flue constructed between the furnaces of an evaporating-pan or steam-boiler and the smoke-stack thereof, said flue having doors at each end thereof, a tier of pipes arranged within adapted to carry liquid to the evaporating-pan, said pipes having T-connections at the ends thereof, the pipes and T's being provided with removable plugs the size of the pipes, a steam-escape pipe connecting with said tier of pipes, and a deflector between said pipes, adapted to throw the heat to the ends of the flue, substantially as described.

POWHATAN P. TRUEHEART.
MILTON S. KIMBALL.

Witnesses:
H. A. LONGAN,
F. P. GREEN.